United States Patent
Kondoh et al.

(10) Patent No.: US 8,248,689 B2
(45) Date of Patent: Aug. 21, 2012

(54) DISTRIBUTED RAMAN AMPLIFYING SYSTEM, START-UP METHOD THEREOF, AND OPTICAL DEVICE

(75) Inventors: Masanori Kondoh, Kawasaki (JP); Yasushi Sugaya, Kawasaki (JP); Togo Fukushi, Kawasaki (JP); Miki Onaka, Kawasaki (JP); Kiyotoshi Noheji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/254,326

(22) Filed: Oct. 20, 2008

(65) Prior Publication Data
US 2009/0195862 A1 Aug. 6, 2009

(30) Foreign Application Priority Data
Feb. 4, 2008 (JP) .................................. 2008-024364

(51) Int. Cl.
*H01S 3/30* (2006.01)
*H04B 10/17* (2006.01)
*H04B 10/12* (2006.01)

(52) U.S. Cl. ........................................................ 359/334
(58) Field of Classification Search .................. 359/334
See application file for complete search history.

(56) References Cited

U.S. PATENT DOCUMENTS

| | | | | |
|---|---|---|---|---|
| 6,639,715 B2* | 10/2003 | Naito et al. | ................... | 359/334 |
| 7,068,421 B2* | 6/2006 | Tokura et al. | ................. | 359/334 |
| 2004/0080812 A1* | 4/2004 | Sugaya et al. | ................ | 359/334 |
| 2004/0196158 A1* | 10/2004 | Sugaya et al. | ............. | 340/815.4 |
| 2005/0237600 A1* | 10/2005 | Isshiki | ........................ | 359/334 |
| 2009/0190206 A1* | 7/2009 | Onaka et al. | .................. | 359/334 |

FOREIGN PATENT DOCUMENTS

| | | | |
|---|---|---|---|
| EP | 1460737 A1 | * | 9/2004 |
| JP | 2004-193640 | | 7/2004 |
| JP | 2008182679 A | * | 8/2008 |

* cited by examiner

*Primary Examiner* — Eric Bolda
(74) *Attorney, Agent, or Firm* — Staas & Halsey LLP

(57) ABSTRACT

To obtain automatic gain control with high accuracy by including first and second light monitors, a reference light supplying unit supplying reference light of which wavelength is set within a gain band of a distributed Raman amplification and out of a wavelength band of main signal light to the optical transmission path, a first reference light monitor monitoring a power of the reference light input to the optical transmission path from one end side thereof, a second reference light monitor monitoring the power of the reference light output from the other end side of the optical transmission path, and a controlling unit controlling supply of pump light in a pump light supplying unit as well as supervising a state of the optical transmission path, based on monitor results from the first and second light monitor and the monitor results in the first and second reference light monitors.

13 Claims, 12 Drawing Sheets

| GAIN REFERENCE LIGHT | PUMP | MAIN SIGNAL |
|---|---|---|
| ON | | |
| OFF | ON | NONE |
| ON | | |

DISTRIBUTED RAMAN AMPLIFYING SYSTEM, START-UP METHOD THEREOF, AND OPTICAL DEVICE

CROSS-REFERENCE TO RELATED APPLICATION(S)

This application is based upon and claims the benefit of priority of the prior Japanese Application No. 2008-024364, filed on Feb. 4, 2008 in Japan, the entire contents of which are hereby incorporated by reference.

FIELD

The present invention relates to a distributed Raman amplifying system, a start-up method thereof, and an optical device, suitable for being used in an optical communication system.

BACKGROUND

Due to increase in communication traffic of recent years, demand for an optical communication transmitting device has been grown. The optical communication transmitting device is actively introduced not only in an optical relay node introduced in a backbone network, but also in a local network recently, and further, an optical network is formed in a subscriber system. In this manner, the optical communication system has an important role in a global information network. An optical amplifying relay provided with a wavelength multiplexing optical amplifier such as an erbium doped fiber amplifier (EDFA) for each transmission path for realizing high-capacity and long-distance transmission at a low cost and high confidence predominates in the optical network.

In the optical amplifying relay system, with a condition that a relay loss is large due to a long transmission path, an input level of signal light to the optical amplifier becomes smaller, so that it is possible that SN (ratio of signal light power to noise light power) deteriorates and transparency characteristics deteriorate. In order to avoid this, a transmission path distributed Raman amplification in which excitation light (pump light) is injected into the transmission path to use an amplification effect using an effect of induction Raman scattering is effectively applied.

A distributed Raman optical amplifier (DRA) has been already put to practical use as an effective realizing means for providing the transmission path distributed Raman amplification. By applying the distributed Raman amplifier, the input level to the to optical amplifier such as the EDFA increases to increase the SN, and the transmission characteristics are improved, so that the number of spans to be transmitted increases. In addition, in the Raman amplification, the wavelength characteristics of gain may be stabilized by performing automatic gain control.

Japanese Patent Application Laid-Open No. 2004-193640 to be described later discloses the conventional technology regarding the automatic gain control of the DRA. Japanese Patent Application Laid-Open No. 2004-193640 discloses the technology to keep the output wavelength characteristics of the Raman amplification constant by providing the transmission path distributed Raman amplification with the automatic gain control regardless of conditions such as the gain efficient of an optical fiber forming the transmission path and a loss of connection path, and the signal light level. The technology disclosed in Japanese Patent Application Laid-Open No. 2004-193640 refers to obtain the Raman gain by using the reference light not subjected to the Raman amplification and control the pump light such that this reaches a predetermined value.

However, if the condition of the gain reference light is such that this is not subjected to the Raman amplification, the wavelength of the reference light is set in a range very distant from the wavelength band of the signal light. Then, the characteristics such as the loss coefficient of the optical transmission path differ between the signal light and the reference light, so that a significant error occurs between the level of the signal light and the level of the reference light at an output point of the optical transmission path.

Therefore, even if the pump light is controlled based on the level of the reference light detected at the output point, it is difficult to realize the automatic gain control of the DRA with high accuracy, and it is difficult to compensate the gain wavelength characteristics of the DRA by a fixed gain equalizer regardless of change of a kind of fiber and fiber characteristics of the optical transmission path.

SUMMARY

Therefore, an object of the present application is to realize the automatic gain control of the transmission path distributed Raman amplification with higher accuracy than that of the conventional art.

(1) Therefore, there is provided a distributed Raman amplifying system includes: a pump light supplying unit connected to one end side, the other end side, or both end sides of an optical transmission path, for supplying pump light to amplify light transmitted through the optical transmission path by distributed Raman amplification to the optical transmission path; a first light monitor for respectively monitoring powers of main signal light and optical supervisory channel light input to the optical transmission path from the one end side of the optical transmission path; a second light monitor for respectively monitoring powers of light wavelength bands of the main signal light and the optical supervisory channel light output from the other end side of the optical transmission path; a reference light supplying unit connected to the one end side of the optical transmission path for supplying reference light of which wavelength is set within a gain band of the distributed Raman amplification and out of a wavelength band of the main signal light to the optical transmission path; a first reference light monitor for monitoring a power of the reference light input to the optical transmission path from one end side of the optical transmission path; a second reference light monitor for monitoring the power of the reference light output from the other end side of the optical transmission path; and a controlling unit for controlling the supply of the pump light in the pump light supplying unit as well as supervising a state of the optical transmission path, based on monitor results from the first and second light monitors and monitor results in the first and second reference light monitors.

(2) Also, there is provided an optical device that is connected to the one end side of the optical transmission path in the distributed Raman amplifying system of the above (1), the device including the first monitor, the reference light supplying unit, and the first reference light monitor.

(3) Further, there is provided an optical device that is connected to the other end side of the optical transmission path in the distributed Raman amplifying system of the above (1), the device including the second monitor, and the second reference light monitor.

(4) In addition, there is provided a start-up method of a distributed Raman amplifying system, includes: while turning off transmission of main signal light and optical supervisory channel light input to an optical transmission path together with supply of pump light for distributed Raman amplification from one end side, the other end side, or both end sides of the optical transmission path to the optical transmission path, supplying reference light to the optical transmission path from the one end side of the optical transmission path, wherein the reference light is light of which wavelength is set within a gain band of the distributed Raman amplification and out of a wave length band of the main signal light; monitoring a power of the reference light at portions at which the reference light is input from the one end side of the optical transmission path and at which the reference light is output from the other end side of the optical transmission path to measure a span loss based on the monitor result; switching the supply of the pump light from an off state to an on state, and turning on conduction of the optical supervisory channel light in the optical transmission path; switching the supply of the reference light from the on state to the off state, and monitoring a noise light power of the main signal wavelength band by the distributed Raman amplification, and the noise light power of the reference light wavelength band output from the other end of the optical transmission path by the distributed Raman amplification to obtain a first parameter relationship being a relationship between the main signal wavelength band noise light power and the reference light wavelength band noise light power; turning on an optical amplifier placed on the one end side of the optical transmission path, and obtaining a gain value by the distributed Raman amplification in the optical transmission path for the wavelength bands of the main signal light and the reference light in amplifier noise light output from the optical amplifier using the main signal wavelength band noise light power and the reference light wavelength band noise light power, thereby obtaining a second parameter relationship being the relationship between the gain value by the distributed Raman amplification in the light wavelength band of the main signal light and the gain value by the distributed Raman amplification in the light wavelength band of the reference light; and calculating the power of the light wavelength band of the main signal light to be monitored at a portion output from the other end side of the optical transmission path corresponding to the gain to be targeted in the distributed Raman amplifying system as a target power of the gain control based on the first and second parameter relationships, at the time of start-up of the distributed Raman amplifying system.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE PREFERRED EMBODIMENTS

Hereinafter, an embodiment is described with reference to the drawings.

[a] Configuration

Figure 1:
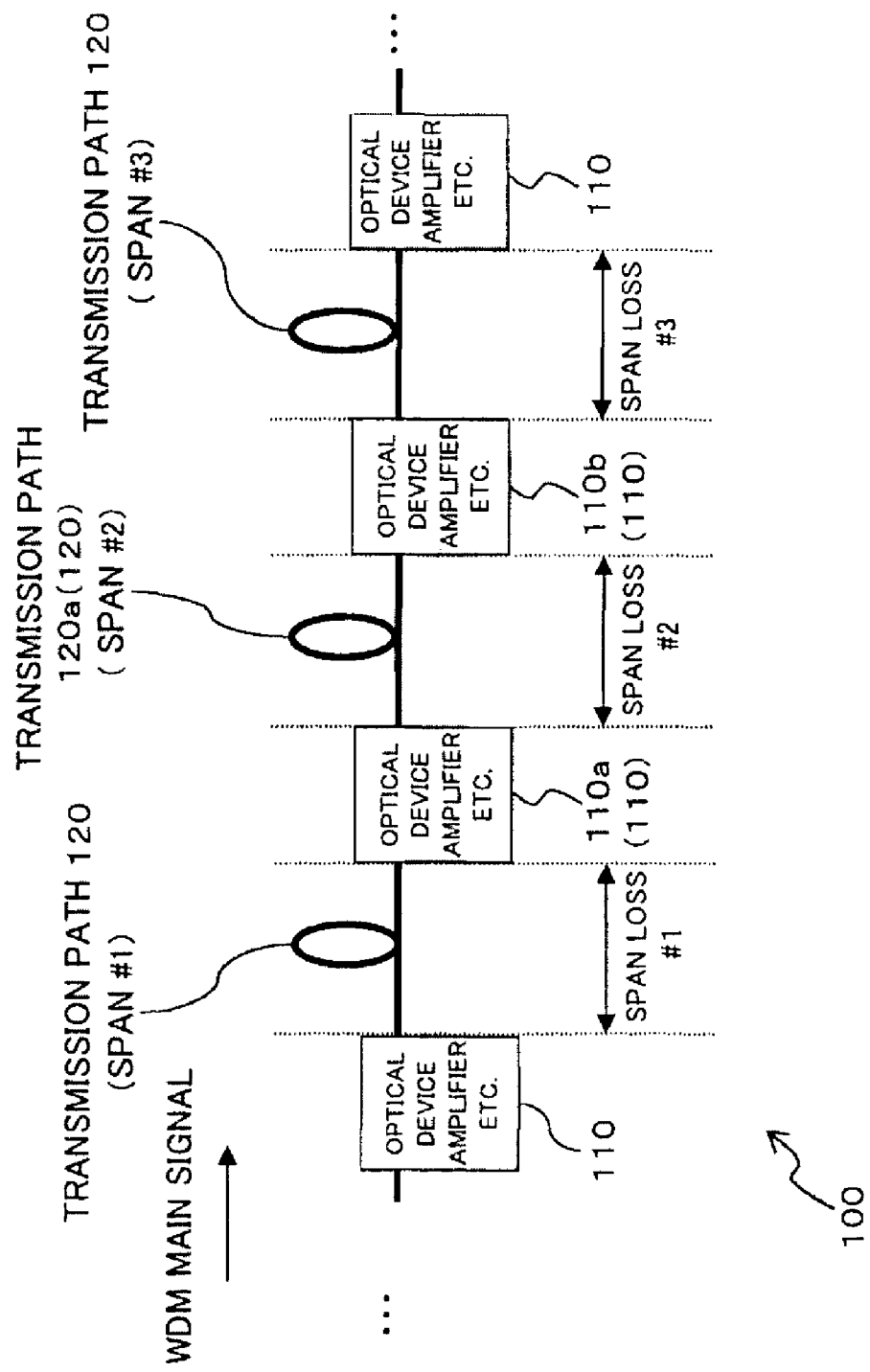
FIG. 1 is a view showing an optical communication system to which a distributed Raman amplifying system in one embodiment is applied.

FIG. 1 is a view showing an optical communication system to which a distributed Raman amplifying system according to one embodiment is applied. In an optical communication system 100 shown in FIG. 1, a plurality of optical devices 110 are placed on an optical transmission path, which transmits wavelength-division multiplexing (WDM) main signal light, and one span of optical transmission path 120 is formed of the optical transmission path between adjacent optical devices 110 (three spans #1 to #3 are shown in FIG. 1).

Figure 2:
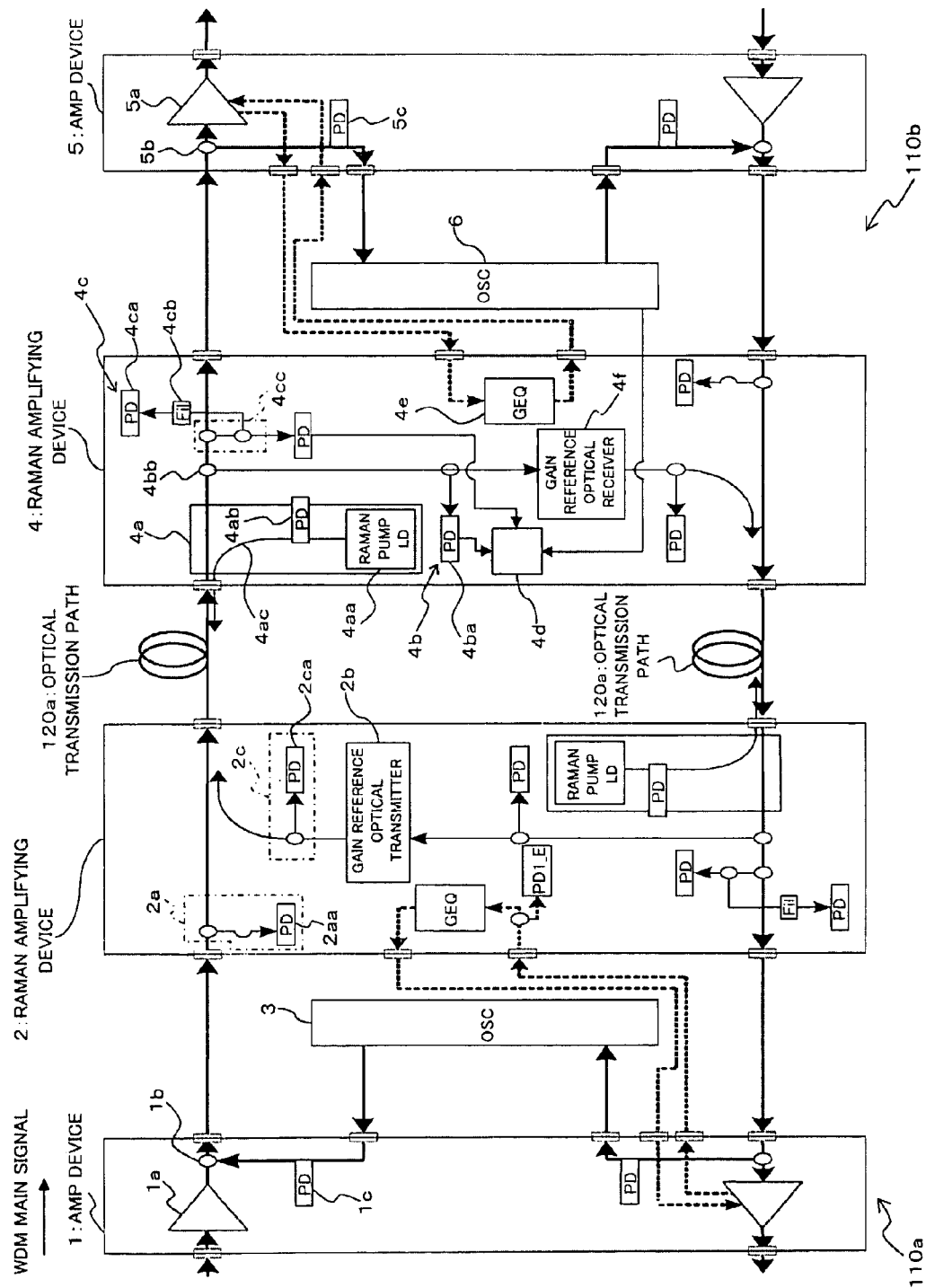
FIG. 2 is a view showing a distributed Raman amplifying system in this embodiment.

The two adjacent optical devices 110 connected to the optical transmission path 120 of each span #1 to #3 (such as optical devices 110a and 110b connected to the optical transmission path 120a of the span #2) are configured to cooperate with each other to provide transmission path distributed Raman amplification, as shown in FIG. 2, for example, in order to improve SN ratio deterioration due to a transmission loss of the optical transmission path 120 forming each span #1 to #3 (span losses #1 to #3). That is to say, in FIG. 2, the distributed Raman amplifying system is composed of the optical devices 110a and 110b connected through the optical transmission path 120a.

Herein, although only one direction is shown as a transmission direction of the WDM main signal light in the optical communication system 100 shown in FIG. 1, the configuration to transmit the WDM main signal light to two-way transmission directions may be provided, as shown in FIG. 2. Meanwhile, although hereinafter, for simplicity of description, it is described focusing on the configuration to transmit the WDM main signal light in one transmission direction (transmission direction of the WDM main signal light is from a left side to a right side in FIG. 2) especially in the optical devices 110a and 110b, the configuration of optical transmission in other transmission direction is similar to the same.

That is to say, as shown in FIG. 2, the optical device 110a is connected to one end of the optical transmission path 120a, and the optical device 110b is connected to the other end of the optical transmission path 120a. The optical device 110a may transmit the WDM main signal light to the optical device 110b through the optical transmission path 120a. Herein, the optical device 110a is provided with an AMP device 1, a Raman amplifying device 2, and an optical supervisory channel (OSC) 3, and the optical device 110b is provided with a Raman amplifying device 4, an AMP device 5, and an optical supervisory channel (OSC) 6.

The AMP device 1 is provided with an optical amplifier 1a for amplifying the WDM main signal light from an adjacent span (#1 in FIG. 1) to output to the Raman amplifying device 2, and a multiplexer 1b for multiplexing optical supervisory channel light (OSC light) from the OSC 3 with the light amplified by the optical amplifier 1a to output to the Raman amplifying device 2 side, and is provided with an optical supervisory channel light monitor photo diode (PD) 1c for monitoring power of the optical supervisory channel light from the OSC 3.

Also, the Raman amplifying device 2 is connected to the optical transmission path 120a at one end side thereof to control the distributed Raman amplification for the light transmitted through the optical transmission path 120a by cooperating with the Raman amplifying device 4 composing the optical device 110b. Herein, the Raman amplifying device 2 is provided with a light monitor unit 2a, a gain reference light transmitter 2b, and a gain reference light monitor unit 2c.

The light monitor unit 2a monitors light power of a wavelength band of the WDM main signal light from the optical amplifier 1a composing the AMP device 1, by receiving a part of the WDM main signal light by a PD 2aa. Meanwhile, the above-described light monitor unit 2a and an optical supervisory channel light monitor PD 1c compose a first light monitor for monitoring power of the main signal light and of the optical supervisory channel light input to the optical transmission path 120a from one end side thereof respectively.

The gain reference light transmitter (reference light supplying unit) 2b is connected to the optical transmission path 120a of the span #2, for supplying gain reference light (reference light) of which wavelength is set within a gain band of the distributed Raman amplification and out of the wavelength band of the WDM main signal light to the optical transmission path 120a. Further, the gain reference light monitor unit (first reference light monitor) 2c is to monitor power of the reference light input from the gain reference light transmitter 2b to the optical transmission path 120a from one end side thereof by receiving the same by the PD 2ca.

Figure 3:
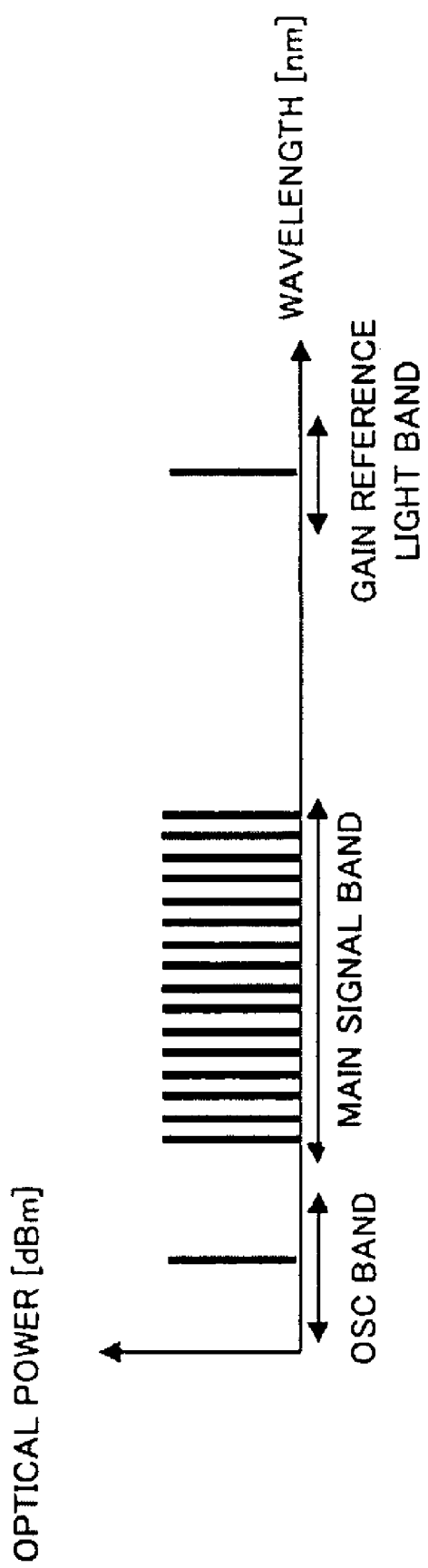
FIG. 3 is a view showing an example of a possible light wavelength arrangement of main signal light, as well as OSC light and gain reference light.

FIG. 3 is a view showing an example of a possible light wavelength arrangement of the main signal light as well as the above-described OSC light and the gain reference light. The OSC light and the gain reference light have the wavelength bands different from the wavelength band (herein, 1,530 to 1,564 nm) of the main signal light. The OSC light has, for example, the wavelength band 1,510 nm, which is shorter than the main signal wavelength band, and reciprocates optical supervisory information between the optical devices 110, and is herein required to be transmitted and received between the optical supervisory channels 3 and 6 of the optical devices 110a and 110b, respectively.

On the other hand, the optical transmission path 120a is required to be formed relatively long, and it is set that the OSC light is light having the wavelength 1,510 nm, for example, which is shorter than the main signal wavelength band (loss characteristics of the optical transmission path 120a are considered to be larger than those of the main signal light). However, by being subjected to the Raman amplification by the Raman amplifying devices 2 and 4, it becomes possible to transmit and receive the OSC light between the optical supervisory channels 3 and 6 through the optical transmission path 120a with excellent transmission and reception characteristics.

On the other hand, the gain reference light is transmitted through the optical transmission path 120a so as to monitor noise characteristics associated with the Raman amplification as well as the Raman gain in the Raman amplifying devices 2 and 4, and the wavelength with which the loss characteristics of the optical transmission path 120a are excellent and within the Raman amplification band is selected. For example, as shown in FIG. 3, it may be set to 1,610 nm, which is the wavelength band longer than the main signal wavelength band.

Also, the Raman amplifying device 4 is connected to the optical transmission path 120a at the other end side thereof to control the distributed Raman amplification for the light transmitted through the optical transmission path 120a together with the above-described Raman amplifying device 2, and is provided with a pump light supplying unit 4a, a gain reference light monitor unit 4b, a main signal monitor unit 4c, a controlling unit 4d, a gain equalizer 4e, and a gain reference light receiver 4f.

The pump light supplying unit 4a is to supply pump light for providing distributed Raman amplification to the light transmitted through the optical transmission path 120a by backward pumping to the optical transmission path 120a. Herein, the pump light supplying unit 4a may be composed of a Raman pump LD 4aa, a PD 4ab, and a WDM multiplexer 4ac. The Raman pump LD 4aa is a light source of the pump light for providing the Raman amplification to the light transmitted trough the optical transmission path 120a by the backward pumping. The PD 4ab receives power of the pump light output from the Raman pump LD 4aa to stabilize at target pump light intensity by the control by the controlling unit 4d to be described later. Further, the WDM multiplexer 4ac outputs the light output from the other end of the optical transmission path 120a to a downstream side, on the other hand, outputs the pump light from the Raman pump LD 4aa to the optical transmission path 120a.

Figure 4:
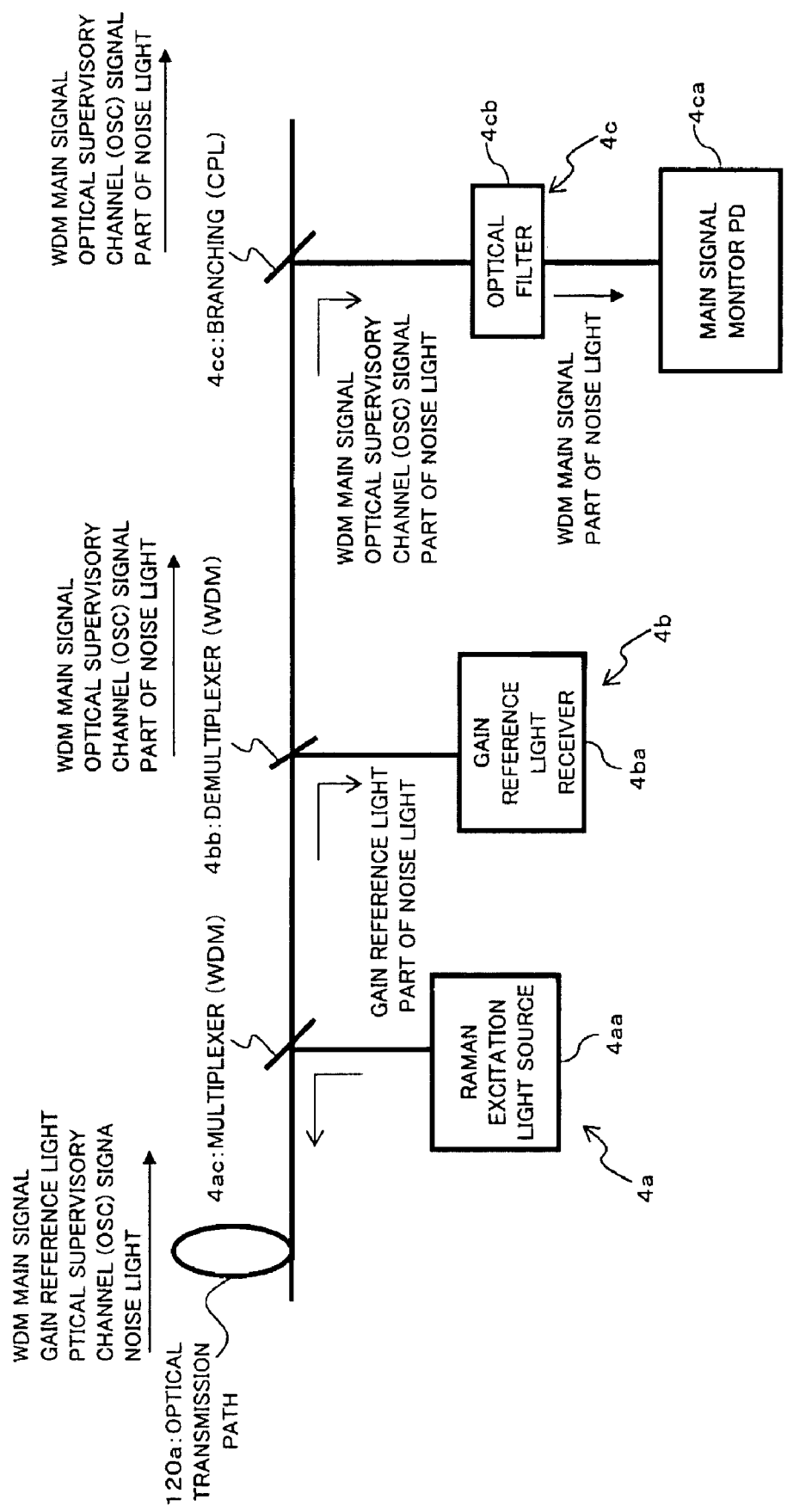
FIG. 4 is a view showing a substantial part of a Raman amplifying device according to this embodiment.

Meanwhile, in order to improve efficiency of distributed Raman amplification in the optical transmission path 120a, the pump light supplying unit 4a is placed, for example, at a portion closer to the optical transmission path 120a than other optical members 4b and 4a, as shown in FIG. 4, thereby making a loss of the pump light generated until reaching the optical transmission path 120a the smallest. In addition, although the pump light supplying unit 4a is provided within the Raman amplifying device 4 for the backward pumping in this embodiment, the position thereof is not limited to this, and this may be provided within the Raman amplifying device 2 for forward pumping, or within the Raman amplifying devices 2 and 4 for both the forward and backward pumping.

Further, a gain reference light monitor unit (second reference light monitor) 4b is to monitor the power of the reference light output from the other end side of the optical transmission path 120a by receiving the same by a PD 4ba, and is provided with the PD 4ba and a WDM demultiplexer 4bb. The WDM demultiplexer 4bb demultiplexes the light input from the optical transmission path 120a through the WDM multiplexer 4ac, and outputs the light of the gain reference light wavelength to the PD 4ba and the light of the wavelengths of the OSC light and the main signal light having other light wavelengths to a main signal light monitor unit 4c on a subsequent stage. Further, the PD 4ba is to receive the reference light from the WDM demultiplexer 4ba to monitor, and a monitored result is output to the controlling unit 4d.

Figure 5:
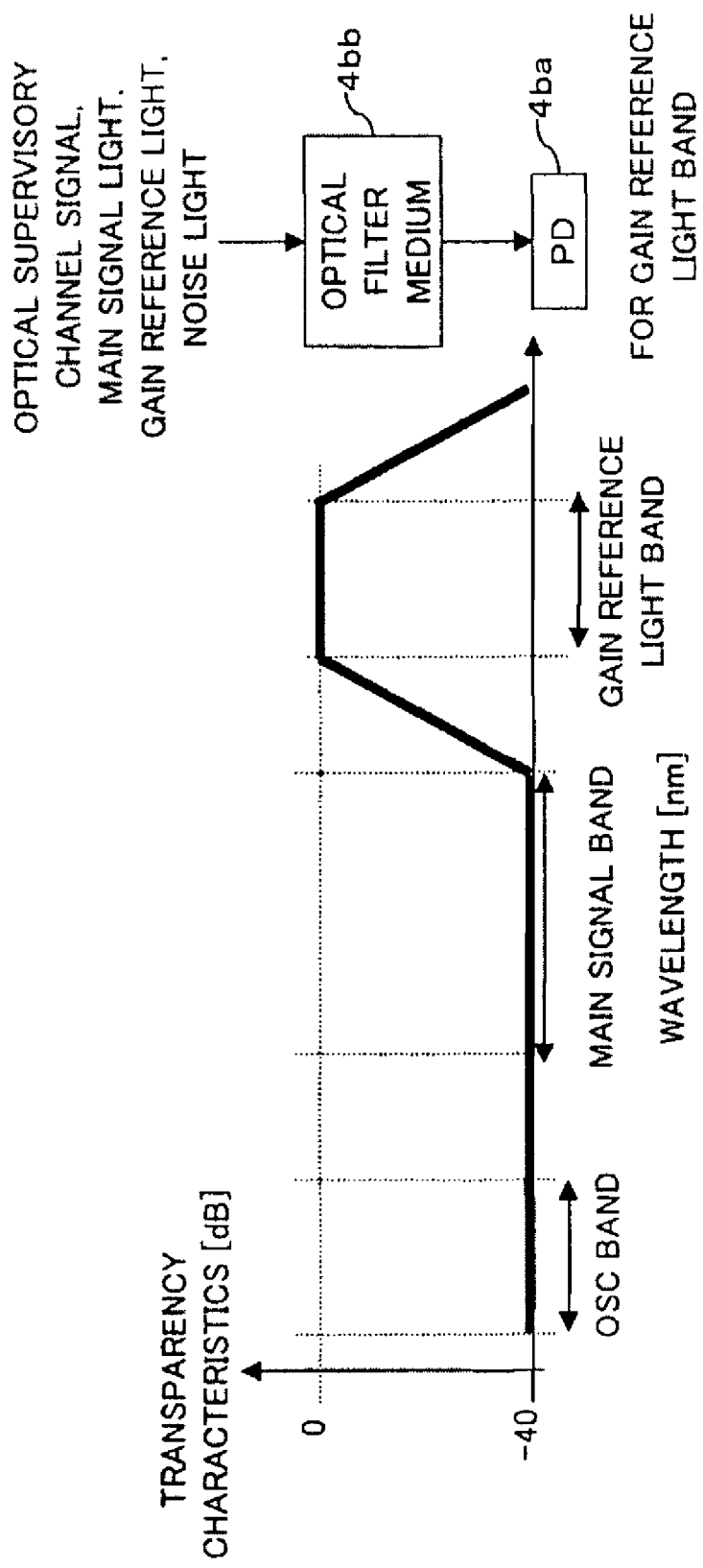
FIGS. 5 and 6 are views illustrating a gain reference light monitor unit according to this embodiment.

The gain reference light monitor unit 4b is placed on an upstream side in the light transmission with respect to the main signal light monitor unit 4c to be described later as shown in FIG. 4. That is to say, the gain reference light monitor unit 4b is placed on a portion further from the optical transmission path 120a than the pump light supplying unit 4a but closer to the optical transmission path 120a than the main signal light monitor unit 4c. Out of the main signal light, the OSC light, and the gain reference light, transmitted through the optical transmission path 120a, the gain reference light is placed in the longest wavelength band. In other words, wavelength transparency characteristics of light guided from the WDM demultiplexer 4bb to the PD 4ba is, for example, as shown in FIG. 5.

Therefore, by being placed on the upstream side in the optical transmission direction with respect to the main signal light monitor 4c, as the gain reference light to be received by the PD 4ba, only the light in a band edge on the long wavelength side in the light wavelength band has to be introduced, so that a configuration to introduce the light of the wavelength band of the gain reference light may be simplified by placing the WDM demultiplexer 4bb or the like, and it also becomes possible to shut the transmission of the gain reference light to a downstream side.

In addition, the main signal light monitor unit 4c is to monitor the power of the light of the main signal light wavelength band output from the other end side of the optical transmission path 120a by receiving the same by a PD 4ca, and is provided with the PD 4ca, an optical filter 4cb, and a branching 4cc. The branching 4cc is to branch a part of the light obtained by removing the wavelength band of the gain reference light by the WDM demultiplexer 4ba (light having the wavelength bands of the main signal light and the OSC light), and the optical filter 4cb passes the light having the wavelength band of the main signal light out of the light branched by the branching 4cc and outputs the same to the PD 4ca. The PD 4ca monitors the power of the main signal light from the optical filter 4cb, and the monitor result is output to the controlling unit 4d.

Figure 6:
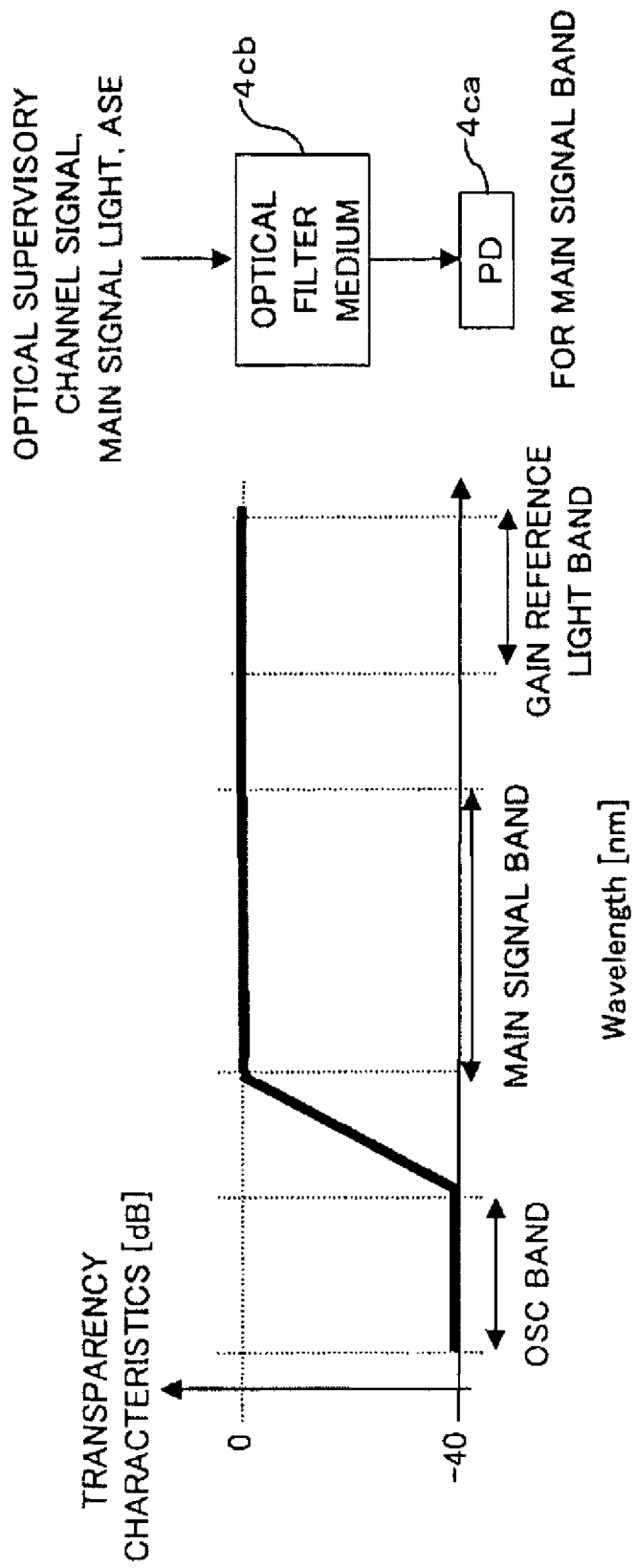

Herein, out of the light transmitted through the optical transmission path 120a, the light having the wavelength of the gain reference light is removed by the WDM demultiplexer 4ba on a previous stage of the main signal light monitor unit 4c, so that the light input to the main signal light monitor unit 4c is the light having the wavelength bands of the OSC light and the main signal light. Therefore, the optical filter 4cb for passing the main signal light does not require the configuration to remove the light having the wavelength band of the gain reference light, and a low-pass filter having the wavelength transparency characteristics to remove the wavelength band of the OSC light as shown in FIG. 6 may be used, as the filter configuration.

On the other hand, by placing the main signal light monitor unit 4c on the upstream side with respect to the gain reference light monitor unit 4b, the configuration of a band filter for removing the gain reference light and the OSC light is required as the optical filter, so that it is supposed that the filter configuration is more complicated than that in the above-described case. In other words, since the gain reference light monitor unit 4b is placed on the upstream side in the light transmission direction with respect to of the main signal light monitor unit 4c, the configuration as the optical filter 4cb may be made more simple.

The controlling unit 4d is to control the supply of the pump light in the pump light supplying unit 4a as well as to supervise a state of the optical transmission path 120a, based on the monitor result from the above-described gain reference light monitor unit 4b and the main signal light monitor unit 4c and the information from the OSC 6. Meanwhile, a specific control mode in the controlling unit 4d is described later. The gain equalizer 4e is to perform gain equalizing control to an optical amplifier 5a provided in the AMP device 5 on the subsequent stage of the Raman amplifying device 4.

A gain reference light receiver 4f receives the gain reference light transmitted from the gain reference light transmitter 2b and demodulates the information modulated into the received gain reference light.

The AMP device 5 is provided with a demultiplexing unit 5b that demultiplexes the main signal light and the OSC light from the branching 4cc in the Raman amplifying device 4, the optical amplifier 5a that amplifies the main signal light demultiplexed by the demultiplexing unit 5b by the control by the above-described gain equalizer 4e, and an OSC light monitor 5c that receives the OSC light demultiplexed by the demultiplexing unit 5b. Meanwhile, it is configured that the signal received by the OSC light monitor 5c is output to the OSC 6.

The OSCs 3 and 6 may receive the OSC light from the opposing optical devices 110, respectively, to monitor the OSC light power, and also obtain the information included in the OSC light. For example, the OSC 6 composing the optical device 110b obtains the information regarding the monitor result of the light monitor unit 2a and the optical supervisory channel light monitor PD 1c composing a first light monitor by receiving the OSC light from the OSC 3 composing the optical device 110a. The above-described main signal light monitor 4c and the OSC light monitor PD 5b compose a second light monitor that monitors the powers of the light wavelength bands of the main signal light and the optical supervisory channel light output from the other end side of the optical transmission path 120a.

In addition, the controlling unit 4d in the above-described Raman amplifying device 4 may receive the monitor results from the above-described gain reference light monitor unit 4b and the main signal light monitor unit 4c, and receive the information of the monitor results from the optical supervisory channel light monitor PD 1c, the light monitor unit 2a, and the gain reference light monitor unit 2c in the opposed optical device 110a through the OSC light received by the OSC 6.

Thereby, the controlling unit 4d may control the supply of the pump light in the pump light supplying unit 4a as well as supervise the state of the optical transmission path 120a, based on the monitor results from the first and second light monitors and the monitor result in the first and second reference light monitors.

Meanwhile, a function to control the pump light supplying unit 4a composing the above-described controlling unit 4d may be appropriately provided so as to correspond to mounting portion (either or both of the Raman amplifying devices 2 and 4) of the pump light supplying unit 4a.

[b] Control Mode

Next, the control mode in the controlling unit 4d is described. Although hereinafter, the control mode in the transmission direction of the main signal light from the Raman amplifying device 2 to the Raman amplifying device 4, the control in the opposing transmission direction may be similarly performed.

Figure 7:
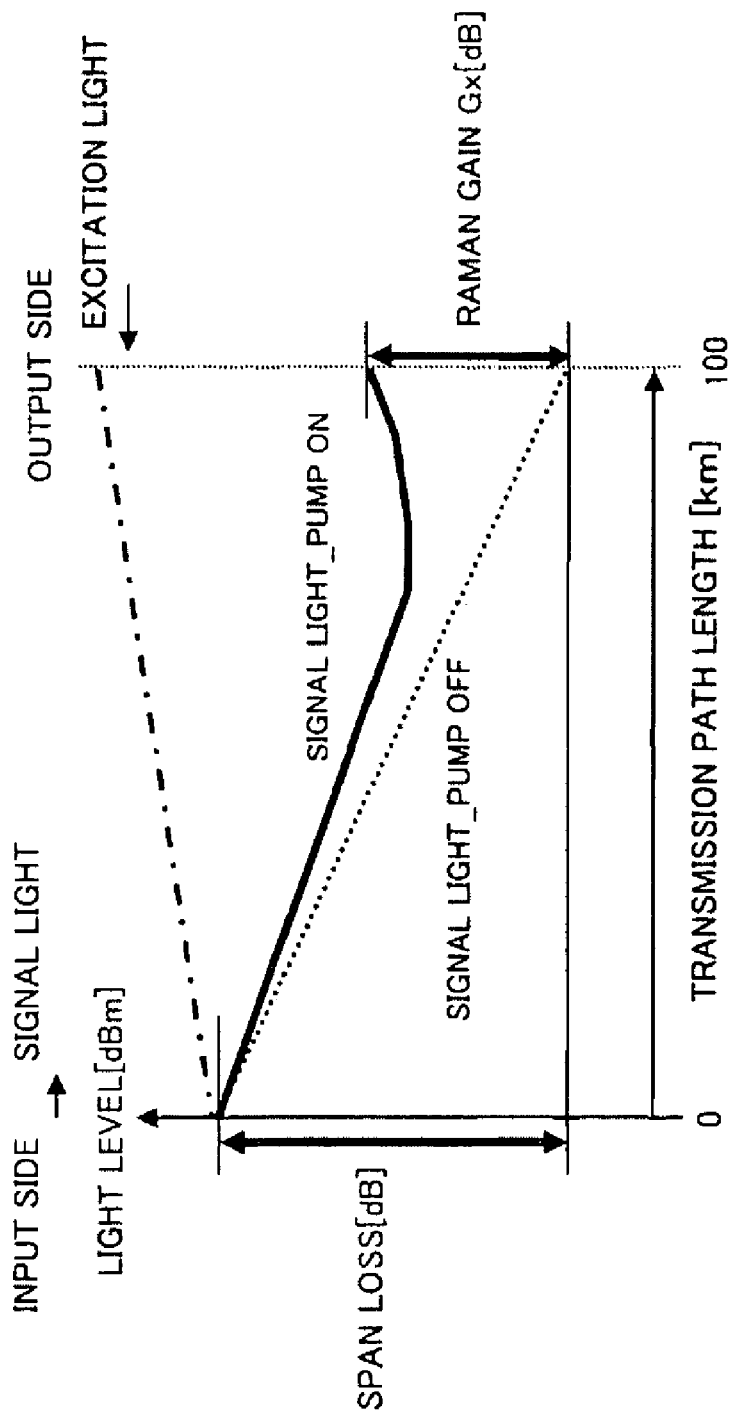
FIG. 7 is a view illustrating distributed Raman amplification of a optical transmission path.

The controlling unit 4d controls the supply of the pump light from the Raman pump LD 4aa in the pump light supplying unit 4a, thereby controlling the Raman gain in the optical transmission path 120a to a constant value Gx, as shown in FIG. 7. Meanwhile, the gain Gx by the distributed Raman amplification in the transmission path 120a is difference between a main signal light output level (level monitored by the main signal light monitor unit 4c: signal light_pump on) from the optical transmission path 120 when the supply of the pump light from the pump light supplying unit 4a is turned on, and the main signal light output level (level monitored by the main signal light monitor unit 4c: signal light_pump off) from the optical transmission path 120a when the supply of the pump light is turned off, as shown in FIG. 7.

Also, a span loss is a loss of the main signal light transmitted through the optical transmission path 120a, and specifically, this may be represented by difference between the main signal light level (main signal light level monitored by the light monitor unit 2a) input to one end of the optical transmission path 120a and the main signal light level (level monitored by the main signal light monitor unit 4c) output from the other end of the optical transmission path 120a.

Herein, it is configured that the controlling unit 4d calculates a target monitor level in the main signal light monitor unit 4c, which achieves the control by the gain value Gx, when starting up the above-described automatic gain control from the state before operating the system (state in which the main signal light is not input to the transmission path), and when operating after the start-up, controls the supply of the pump light so as to reach the target level thus calculated, thereby realizing the above-described automatic gain control.

Figure 8:
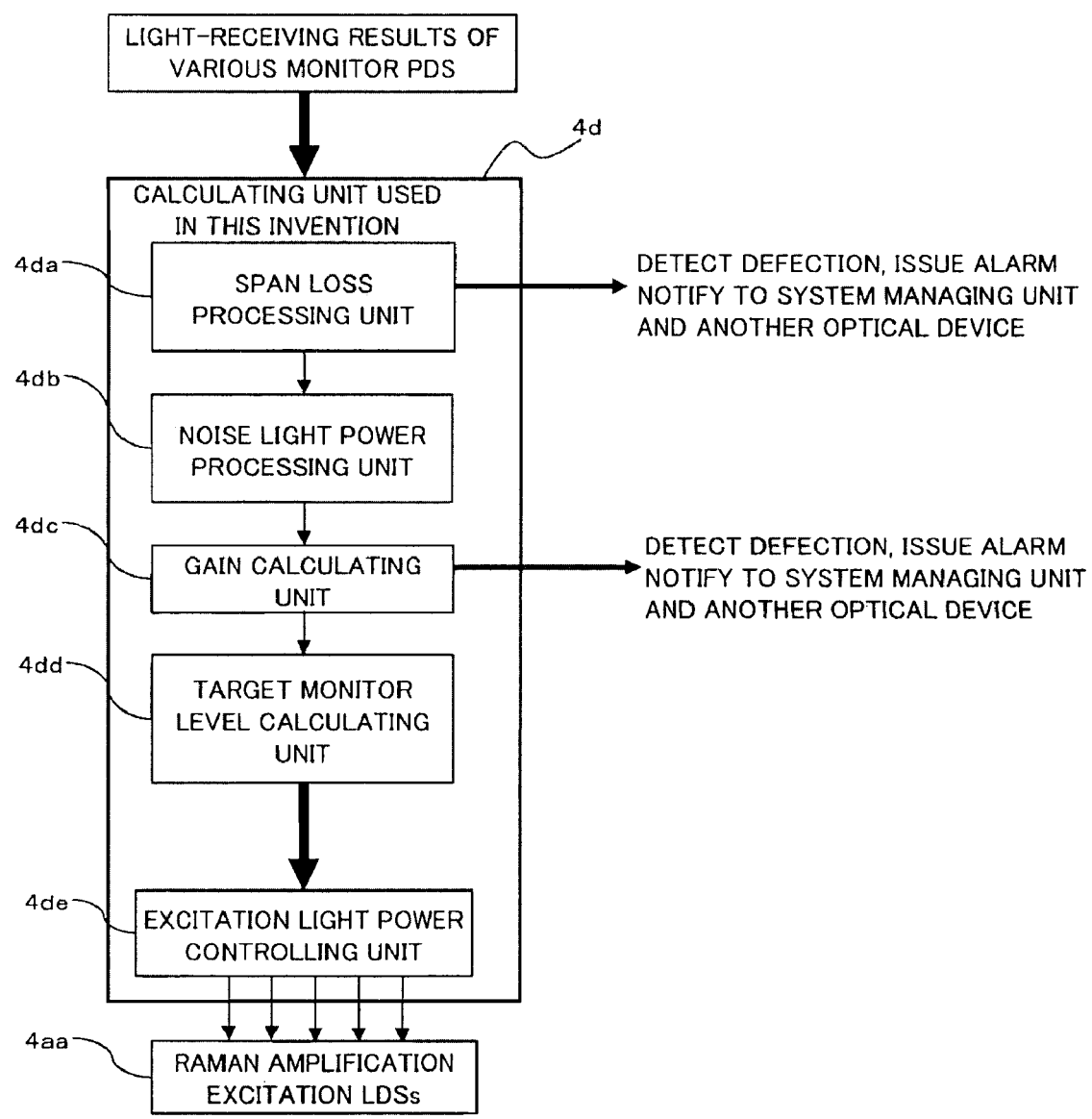
FIG. 8 is a view illustrating a controlling unit according to this embodiment.

That is to say, the controlling unit 4d is provided with a span loss processing unit 4da, a noise light power processing unit 4db, a gain calculating unit 4dc, and a target monitor level calculating unit 4dd, as shown in FIG. 8 in order to start up the automatic gain control from the above-described state before operating the system, and is provided with an excitation light power controlling unit 4de that controls the supply of the pump light power when operating after the start-up. Hereinafter, the configuration of functional units is described according to the start-up operational procedure of a light amplifying system 1 shown in FIG. 9.

Figure 9:
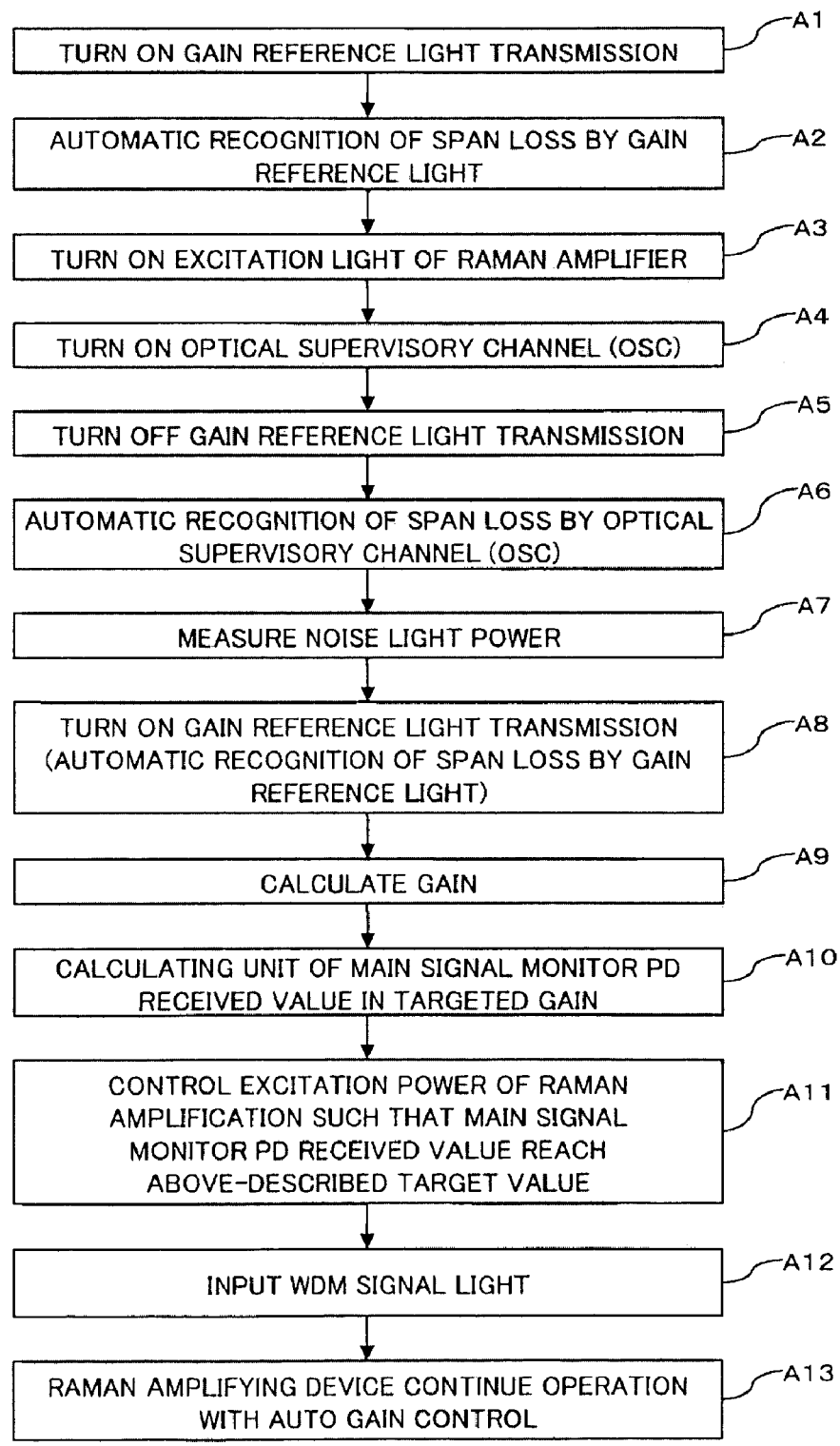
FIG. 9 is a flowchart illustrating an action at the time of start-up and operation of the distributed Raman amplifying system according to this embodiment.

The distributed Raman amplifying system 1 first inputs the gain reference light out of the light supposed to be transmitted through the optical transmission path 120a (the optical supervisory channel light, the pump light (excitation light) for the Raman amplification, the main signal light, and the gain reference light) to the optical transmission path 120a at the time of start-up before operating the system (step A1 in FIG. 9).

The span loss processing unit 4da derives the transmission path loss between the Raman amplifying devices 2 and 4 and the optical transmission path 120a based on the monitor value of the input and output power to and from the optical transmission path 120a of the gain reference light transmitted through the optical transmission path 120a (step A2), and checks whether the Raman amplifying devices 2 and 4 and the optical transmission path 120a are connected (whether they are in conduction state) or not based on the derived span loss value.

The reason why the gain reference light is first input to the optical transmission path 120a for recognition of the connection state between the Raman amplifying devices 2 and 4 and the optical transmission path 120a and the span loss, in a state before operating the system in which the main signal light is not conductive, is as follows. That is to say, in the previous stage in which the connection between the optical transmission path 120a and the Raman amplifying devices 2 and 4 is checked, it is not preferable that the high-power pump light is input, because an additional procedure for assuring safety is required. Also, since the optical supervisory channel light generally becomes receivable when the Raman excitation light is input to the transmission path and the Raman amplification is generated, the transmission requires the Raman excitation light. On the other hand, the gain reference light is supposed to have the wavelength band of which transmission path loss is relatively low, so that this does not require the power for the Raman excitation corresponding to the pump light for the transmission, that is to say, it is possible to transmit and receive through the optical transmission path 120a without being subjected to the Raman amplification. Therefore, the conduction check and derivation of the span loss of the optical transmission path 120a, which are first required as the start-up procedure, are performed using the gain reference light.

Specifically, the gain reference light supplying unit 2b in the Raman amplifying device 2 transmits various pieces of information (transmission power of the gain reference light, output power of the optical amplifier 1a monitored by the PD 1c, optical component loss information (such as optical component loss information of the Raman amplifying device (the Raman amplifying device 2 in FIG. 2))) on the input side of the transmission path to the gain reference light to be transmitted through the optical transmission path 120a by modulating the same. The gain reference light receiver 4f of the Raman amplifying device 4 receives the gain reference light from the above-described gain reference light supplying unit 2b and demodulates the modulated information, and provides the demodulated information to the span loss processing unit 4da. Thereby, the span loss processing unit 4da of the Raman amplifying device 4 may derive the span loss in the gain reference light wavelength band by the difference between the information of the transmission power of the gain reference light from the gain reference light receiver 4f and the monitor result from the gain reference light monitor unit 4b.

Alternatively, the gain reference light supplying unit 2b in the Raman amplifying device 2 allows the gain reference light to be input to the optical transmission path 120a. Then, the span loss processing unit 4da of the Raman amplifying device 4 may store the information of the input power of the gain reference light from the gain reference light supplying unit 2b to the optical transmission path 120a in advance, and derive the span loss in the gain reference light wavelength band by the difference between the input power information and the monitor result from the gain reference light monitor unit 4b. Meanwhile, the value of the main signal light corresponding to the span loss may be obtained by multiplying the value of the span loss in the gain reference light wavelength band thus obtained by a certain coefficient as a transmission path loss ratio.

Further, when the value of the span loss thus derived is larger than a prescribed value, it is estimated that the optical transmission path between the above-described reference light supplying unit 2b and the gain reference light monitor unit 4b, that is to say, between the Raman amplifying devices 2 and 4 are disconnected, so that it is possible to issue alarm as defect detecting information to other optical devices 110 through a system managing unit (not shown) and the OSC.

In addition, the noise light power processing unit 4db turns on the supply of the pump light (pump light in which a specific target value is set) from the pump light supplying unit 4a to the optical transmission path 120a (step A3) when the conduction of the optical path between the Raman amplifying devices 2 and 4 is checked by the above-described span loss processing unit 4da, then turns on the transmission of the OSC light from the OSC 3 to the OSC 6 (step A4). Thereby, the optical supervisory channel light level is improved by the gain by the Raman amplification even if the transmission path length of the optical transmission path 120a is long and the span loss is large, so that the OSC may received the optical supervisory channel light with excellent reception characteristics in the OSC 6.

Then, the noise light power processing unit 4db outputs request to stop the supply of the gain reference light to the gain reference light supplying unit 2b through the optical supervisory channel (in the conductive state) from the OSC 6 to the OSC 3. The gain reference light supplying unit 2b stops the input of the gain reference light to the optical transmission path 120a according to the step request from the noise light power processing unit 4db (step A5).

Meanwhile, in accordance with the control to stop the supply of the gain reference light by the noise light power processing unit 4db, in the span loss processing unit 4da, the defect detecting process of the optical path based on the monitor result of the gain reference light is also stopped. At that time, the span loss processing unit 4da may receive the monitor result in the OSC light monitor 5c of the power of the optical supervisory channel light transmitted from the OSC 3 through the optical transmission path 120a in place of the gain reference light via OSC6, thereby continuously performing the defect detecting process of the optical path based on the monitor result (step A6).

Then, the noise light power processing unit 4db introduces the monitor result from the gain reference light monitor unit 4b and the main signal light monitor unit 4c, and obtains the noise light (noise light) power generated by the Raman amplification in accordance with the pump light supply to the optical transmission path 120a for each gain reference light band and the main signal light band. That is to say, the noise light power processing unit 4db may obtain the monitor result from the gain reference light monitor unit 4b as the noise light power in the gain reference light band, and obtain the monitor result from the main signal light monitor unit 4c as the noise light power in the main signal light band. Further, the noise light power processing unit 4db also calculates a noise light power ratio from the gain reference light monitor unit 4b and the main signal light monitor unit 4c (step A7).

In other words, the above-described noise light power processing unit 4db measures and calculates the noise light power ratio as a first parameter relationship, which is a relationship between the noise light power in the light wavelength band of the main signal light by the distributed Raman amplification and the noise light power in the light wavelength band of the gain reference light, based on the monitor results in the reference light monitor unit 4b and the main signal light monitor unit 4c, and store the same.

Figure 10:
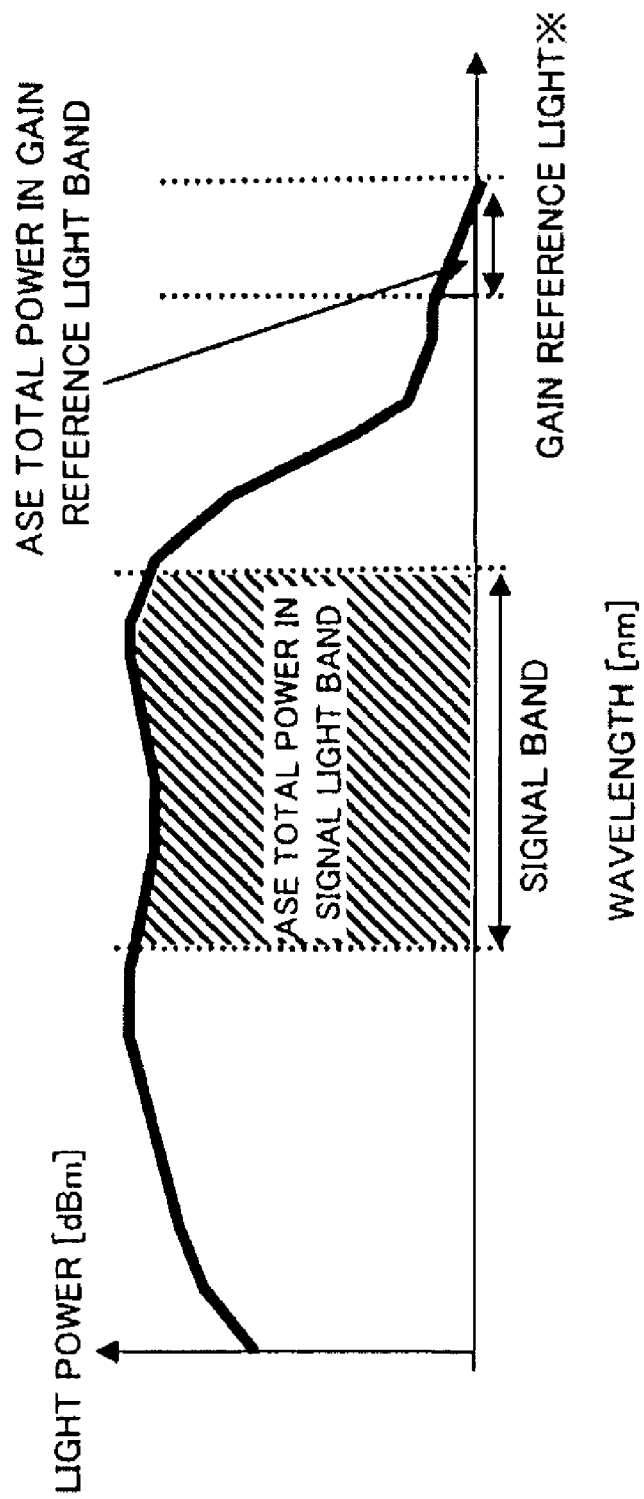
FIG. 10 is a view showing an ASE spectrum generated by the Raman amplification.

FIG. 10 is a view showing an example of a Raman scattering spectrum by the Raman amplification. An ASE (noise light) spectrum by the Raman scattering varies according to a kind of fiber, parameter of fiber, and the excitation light power of the optical transmission path 120a. At the time of start-up before inputting the main signal, the noise light power processing unit 4db actually measures the noise light power in the main signal light wavelength band and the gain reference light wavelength band in order to estimate the gain with high accuracy, and measures and calculates necessary parameter such as the above-described noise light power ratio.

Then, the noise light power processing unit 4db controls to restart supplying the gain reference light from the gain reference light supplying unit 2b through the optical supervisory channel again, after performing the above-described measurement of the noise light power and calculation of the noise light power ratio. Thereby, the span loss processing unit 4da may restore the defect detecting process of the optical path based on the monitor result in the gain reference light monitor unit 4b of the gain reference light (step A8).

That is to say, it is supposed that the Raman gain of the gain reference light is overwhelmingly smaller than that of the OSC light, so that the power variation due to the effect of the Raman amplification is smaller than that of the OSC light, and since the transmission path loss is comparable with that of the main signal light, recognition error of the span loss is smaller. Therefore, it is considered that the above-described defect detection of the optical path is appropriately performed based on the monitor result of the gain reference light, except when the gain reference light is off such as at the time of above-described measurement of the noise light.

Next, the gain calculating unit 4dc calculates the Raman gain in the main signal light band and the gain reference light band, based on the monitor result of the input and output power to and from the optical transmission path 120a for the gain reference light wavelength band and the main signal light wavelength band of the amplifier noise light and the information of the span loss calculated by the span loss processing unit 4da and the information of the noise light power (by the Raman amplification) calculated by the noise light power processing unit 4db, using the amplifier noise light output from the optical amplifier 1a of the AMP device 1 (step A9).

Figure 11:
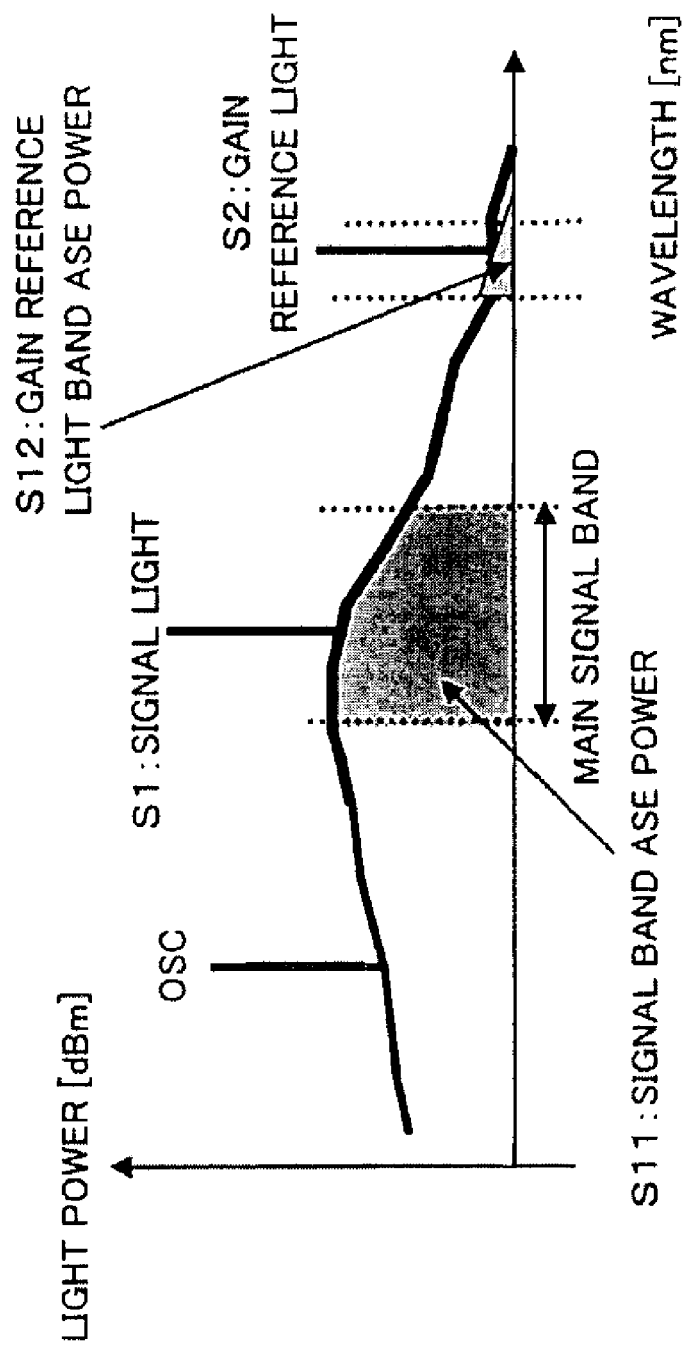
FIG. 11 is a view showing an arrangement example of each light wavelength band, as well as the ASE spectrum generated by the Raman amplification.

That is to say, the gain calculating unit 4dc may calculate the Raman gain in the main signal light band and the gain reference light band respectively, by setting the main signal wavelength band component and the gain reference light wavelength band component of the amplifier noise light to the light of the main signal light wavelength band (for example, refer to S1 in FIG. 11) and the light of the gain reference light wavelength band (refer to S2 in FIG. 11) receiving the gain by the Raman amplification, and by removing the noise light power component (refer to the noise light power S11 in the main signal band and the noise light power S12 in the gain reference light band in FIG. 11) in the corresponding band generated in accordance with the Raman amplification from each monitor value.

Specifically, the gain calculating unit 4dc outputs an instruction to turn on a drive state of the optical amplifier 1a of the AMP device 1 through the optical supervisory channel after the supply of the gain reference light from the above-described gain reference light supplying unit 2b is restarted by the control by the noise light power processing unit 4ad. When the optical amplifier 1a is composed of an erbium doped fiber amplifier (EDFA), for example, the optical amplifier 1a turns on the excitation light to the EDF to output the noise light as the amplifier noise light from the optical amplifier 1a.

The amplifier noise light from the optical amplifier 1a includes the wavelength band of the main signal light and the wavelength band of the gain reference light, and is transmitted through the optical transmission path 120a through the Raman amplifying device 2. At that time, the amplifier noise light having the main signal light wavelength band and the gain reference light wavelength band is amplified by the Raman amplification by the pump light from the pump light supplying unit 4a and is input to the Raman amplifying device 4. The gain reference light monitor unit 4b and the main signal light monitor unit 4c of the Raman amplifying device 4 monitor the light power in each wavelength band.

Herein, the ASE noise light in the gain reference light band receives increment by the Raman amplification as well as the loss by the span loss according to the wavelength band, however, the ASE power generated by the Raman amplification also gets on the wavelength band, so that the total power of the values are monitored by the gain reference light monitor unit 4b. Similarly, the ASE noise light in the main signal light band receives increment by the Raman amplification as well as the loss by the span loss according to the wavelength band, however, the ASE power generated by the Raman amplification also gets on the wavelength band, so that the total power of the values are monitored by the main signal light monitor unit 4c.

The gain calculating unit 4*dc* obtains a corrected value (main signal light power_pump on in an equation (1)) of the amplifier noise light power in the main signal light wavelength band, by subtracting the noise light power of the main signal light band generated by the Raman amplification obtained by the noise light power processing unit 4*db* from the value of the monitor result from the above-described main signal light monitor unit 4*c*, according to the following equation (1). Similarly, this obtains the corrected value (gain reference light power_pump on in an equation (2)) of the amplifier noise light power of the gain reference light wavelength band, by subtracting the noise light power of the gain reference light band generated by the Raman amplification obtained by the noise light power processing unit 4*db* from the value of the monitor result from the gain reference light monitor unit 4*b*, according to the following equation (2).

$$\text{main signal light power pump\_on[dBm]}=10 \log \\ (\text{main signal band monitor power[mW]}-\text{main} \\ \text{signal band noise light power [mW]}) \quad (1)$$

$$\text{gain reference light power pump\_on[dBm]}=10 \log \\ (\text{gain reference light band monitor power[mW]}- \\ \text{gain reference light band noise light power[mW]}) \quad (2)$$

Thereby, the Raman gain in the main signal wavelength band and the Raman gain in the gain reference light wavelength band may be obtained as represented in equations (3) and (4), respectively. Meanwhile, in the equations (3) and (4), the gain reference light power_pump off is a value corresponding to the monitor value of the gain reference light power input from the gain reference light monitor unit 4*b* in the above-described span loss processing unit 4*da*, and the main signal light power_pump off may be a value obtained by multiplying a ratio of a loss coefficient of the main signal wavelength band to the gain reference light wavelength band by the above-described gain reference light power_pump off. Meanwhile, by making the span loss characteristics in each wavelength band of the gain reference light and the main signal light substantially similar to each other, the above-described ratio substantially corresponds to "1".

$$\text{gain\_main signal light(db)}=\text{main signal light power\_} \\ \text{pump on(dBm)}-\text{main signal light power\_pump} \\ \text{off(dBm)} \quad (3)$$

$$\text{gain\_gain reference light (dB)}=\text{gain reference light} \\ \text{power\_pump on(dBm)}-\text{gain reference light pow-} \\ \text{er\_pump off(dbm)} \quad (4)$$

Meanwhile, the gain calculating unit 4*dc* uses the values of the gain of the main signal light wavelength band and the gain of the gain reference light wavelength band thus calculated to calculate the ratio (gain ratio) of the values. The value of the ratio and the value of the ratio calculated by the noise light power processing unit 4*bd* are used in calculation by the target monitor level calculating unit 4*dd* on the subsequent stage.

In other words, the above-described gain calculating unit 4*dc* may measure and calculate the gain ratio as the second parameter relationship, which is the relationship between the gain value by the distributed Raman amplification in the light wavelength band of the main signal light and the gain value by the distributed Raman amplification in the light wavelength band of the gain reference light, and hold the same. Thereby, the above-described noise light power processing unit 4*db* and the gain calculating unit 4*dc* have a function as a parameter relationship deriving unit that measures and calculates the above-described first and second parameter relationships and hold them.

Then, the target monitor level calculating unit 4*dd* derives the target monitor level to be monitored by the main signal light monitor unit 4*c* with respect to the target gain Gx by the calculation as represented by an equation (5), for example, using the gain value calculated by the gain calculating unit 4*dc* (step A10). That is to say, the target monitor value may be represented as a sum of the noise light power in the main signal light band in the gain Gs and the main signal light power in the gain Gx.

$$\text{main signal band target monitor value in gain} \\ Gx=\text{main signal band noise light power\_}Gx+ \\ \text{main signal light power\_}Gx \quad (5)$$

Herein, before operating the system, the noise light power and the gain in the gain reference light and the main signal light are in a proportional relationship (physical phenomenon that the Raman amplification amount of the gain reference light is generated in proportion to the Raman amplification amount in the main signal band). In other words, the noise light power ratio and the gain ratio calculated by the above-described noise light power processing unit 4*db* are constant independent from the gain value Gx or the power of the pump light.

Therefore, in the target monitor level calculating unit 4*dd*, by calculating the noise light power in the main signal light band in the gain Gx and the main signal light power in the gain Gx, using the noise light power ratio and the gain ratio measured as described above, and adding them, the target monitor value may be derived.

In other words, the output and the gain are physical amounts having one to one correspondence relationship in which only the definitions are different, so that when the output is defined, the gain also is defined. Then, even if the condition of the optical transmission path changes due to a certain cause (such as increase in the transmission path loss), the relationship between the Raman amplification output light power (signal light+ASE value) and the gain is in the one to one relationship, and by changing the excitation light power with the target value of the Raman amplification output light power in a predetermined gain obtained by calculation, the control to the predetermined gain with high accuracy becomes possible.

Therefore, the above-described target monitor level calculating unit 4*dd* composes the target power calculating unit that calculates the power of the light wavelength band of the main signal light to be monitored by the main signal light monitor unit 4*c* so as to correspond to the gain to be targeted in the wavelength band of the main signal light when operating the system as the target power, based on the first and second parameter relationships calculated by the noise light power processing unit 4*db* and the gain calculating unit 4*dc*.

Then, the excitation light power controlling unit 4*de* shown in FIG. 8 controls the Raman pump LD 4*aa* in the pump light supplying unit 4*a* such that the monitor value introduced from the main signal light monitor unit 4*c* becomes the target monitor level by input of the target monitor level calculated by the target monitor level calculating unit 4*dd* (step A11).

Thereafter, when it is shifted to the system operating state in a state in which the above-described pump light supply control operates in the excitation light power controlling unit 4*de*, the WDM signal light is input through the AMP device 1 (step A12), however, in this case also, the excitation light power controlling unit 4*de* controls the supply of the pump light such that the monitor value from the main signal light monitor unit 4*c* is stabilized at the target monitor level (step A13), so that the distributed Raman gain in the optical transmission path 120*a* may be stabilized at a certain Gx.

In other words, the excitation light power controlling unit 4de is the pump light power controlling unit that controls the power of the pump light supplied by the pump light supplying unit 4a such that the value of the target power calculated by the target monitor level calculating unit 4dd is obtained as the monitor result of the power of the light wavelength band of the main signal light in the main signal light monitor unit 4c.

In this way, according the above-described embodiment, it is possible to obtain the distributed Raman amplification with higher accuracy than that of the conventional technology through the control by the controlling unit 4d.

[c] Others

Figures 12A, 12B:
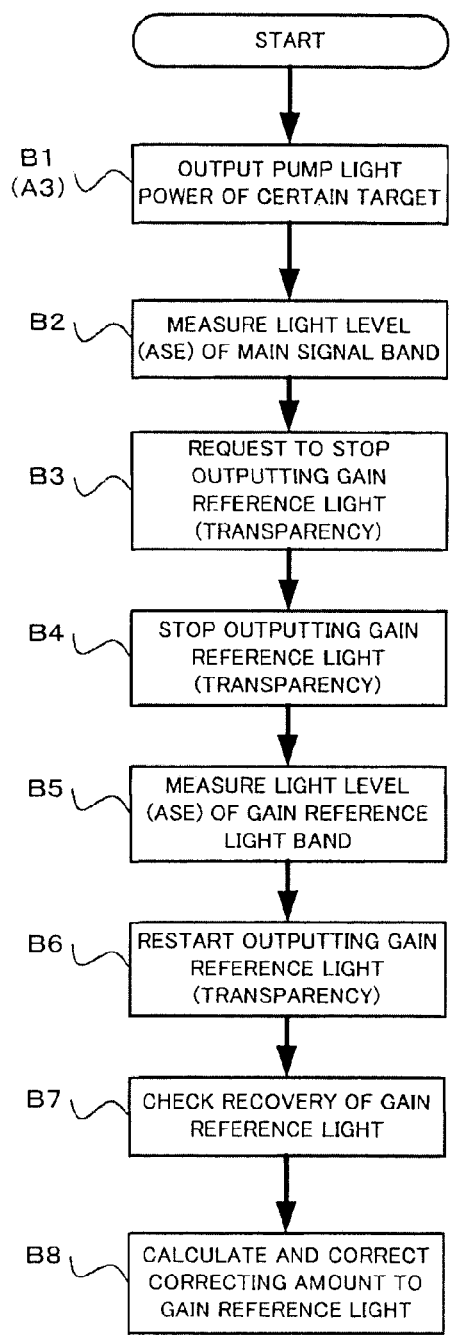
FIGS. 12A and 12B are views showing variations of this embodiment.

Despite of the above-described embodiment, the present embodiment may be implemented with variations As a specific example, FIGS. 12a and 12b are views showing alternative example of the process in the noise light power processing unit 4db composing the above-described controlling unit 4d in the system start-up stage (main signal light "none" in FIG. 12b) in which FIG. 12A is a flowchart for illustrating the operation, and FIG. 12B is a view showing an on/off state of each light (the gain reference light, the pump light, and the main signal light) according to sequence stages shown in FIG. 12A.

As shown in FIG. 12A, after the conduction of the optical path between the Raman amplifying devices 2 and 4 is checked by the span loss processing unit 4da (refer to a step A2 in FIG. 9), when the supply of the pump light (the pump light setting the specific target value) from the pump light supplying unit 4a to the optical transmission path 120a is turned on by the noise light power processing unit 4db (corresponding to a step B1, pump light "on" in FIG. 12B, and a step A3 in FIG. 9), the transmission of the gain reference light is not turned off and the noise light power generated by the Raman amplification in the main signal light wavelength band is measured in advance (refer to a step B2 and a step A7 in FIG. 9), and thereafter, the transmission of the gain reference light is turned off only during measurement of the noise light power generated by the Raman amplification in the wavelength band of the gain reference light (refer to a step B5 and a step A7 in FIG. 9) (FIG. 12B, steps B3 and B4, and steps B6 and B7). Meanwhile, after that, the calculation process by the gain calculating unit 4dc similar to that of the above-described case is performed (refer to a step B8 and a step A9 in FIG. 9).

In other words, as the light used for the defect detection based on the span loss, the gain reference light is preferentially used, except in the stage to measure the noise light power by the Raman amplification in the above-described gain reference light wavelength band. This is because when the gain reference light is used as the light to be used for the defect detection based on the span loss, the gain reference light is in the band in which the Raman gain is smaller than that of the OSC light (refer to FIG. 11), so that the power variation due to the effect of the Raman amplification is smaller than when using the OSC light, and the gain reference light has the transmission path loss substantially equivalent to that of the main signal light, so that the error in span loss recognition in the span loss processing unit 4da may be made smaller.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A distributed Raman amplifying system, comprising:
    a pump light source coupled to one end side, the other end side, or both end sides of an optical transmission path, which supplies pump light to amplify light transmitted through the optical transmission path by distributed Raman amplification to the optical transmission path;
    a first light monitor which monitors powers of main signal light and optical supervisory channel light input to the optical transmission path from the one end side of the optical transmission path;
    a second light monitor which monitors powers of light wavelength bands of the main signal light and the optical supervisory channel light output from the other end side of the optical transmission path;
    a reference light transmitter coupled to the one end side of the optical transmission path which supplies reference light of which wavelength is set within a gain band of the distributed Raman amplification and out of a wavelength band of the main signal light to the optical transmission path;
    a first reference light monitor which monitors a power of the reference light input to the optical transmission path from one end side of the optical transmission path;
    a second reference light monitor which monitors the power of the reference light output from the other end side of the optical transmission path; and
    a processor which controls the supply of the pump light in the pump light source as well as supervising a state of the optical transmission path, based on monitor results from the first and second light monitors and monitor results in the first and second reference light monitors.

2. The distributed Raman amplifying system according to claim 1, wherein the processor calculates a power of the light wavelength band of the main signal light to be monitored by the second light monitor corresponding to a gain to be targeted as a target power, based on the monitor results from the first and second light monitors and the monitor results in the first and second reference light monitors at the time of start-up of a system, on the other hand, controls the supply of the pump light in the pump light source such that the power of the light wavelength band of the main signal light monitored by the second light monitor reaches the target power when operating the system.

3. The distributed Raman amplifying system according to claim 1, comprising:
    first and second optical supervisory channel light transmitting and receiving units which transmits and receives optical supervisory channel light on the one end side and the other end side of the optical transmission path,
    wherein the processor receives the monitor results of the main signal light, the optical supervisory channel light, and the reference light, at an opposing side portion via the optical transmission path through the optical supervisory channel light transmitted and received by the first or second optical supervisory channel light transmitting and receiving unit.

4. The distributed Raman amplifying system according to claim 1, wherein the pump light source is placed on a portion closer to the optical transmission path than the first light monitor and the first optical supervisory channel light transmitting and receiving unit on the one end side of the optical transmission path, or the second light monitor and the second optical supervisory channel light transmitting and receiving unit on the other end side of the optical transmission path.

5. The distributed Raman amplifying system according to claim 4, wherein
the pump light source is placed on the other end side of the optical transmission path, and
the processor receives information of the monitor result from the first reference light monitor and the first light monitor from the optical supervisory channel light received by the second optical supervisory channel transmitting and receiving unit on the other end side of the optical transmission path, and controls the supply of the pump light in the pump light source based on the received information of the monitor results and the monitor results in the second light monitor and the second reference light monitor.

6. The distributed Raman amplifying system according to claim 5, wherein the second reference light monitor is placed on a portion closer to the optical transmission path than the second light monitor and the second optical supervisory channel light transmitting and receiving unit.

7. The distributed Raman amplifying system according to claim 1, wherein an optical amplifier which amplifies the main signal light to be input is placed on an input side of the first light monitor, and the optical amplifier is configured to be controlled on and off through the optical supervisory channel light from the second optical supervisory channel light transmitting and receiving unit to the first optical supervisory channel light transmitting and receiving unit.

8. The distributed Raman amplifying system according to claim 1, wherein the processor
calculates a first parameter relationship being a relationship between a noise light power in the light wavelength band of the main signal light by the distributed Raman amplification and the noise light power in the light wavelength band of the reference light, and a second parameter relationship being a relationship between a gain value by the distributed Raman amplification in the light wavelength band of the main signal light and the gain value by the distributed Raman amplification in the light wavelength band of the reference light, at the time of start-up of the system,
calculates the power of the light wavelength band of the main signal light to be monitored by the second light monitor corresponding to the gain to be targeted in the wavelength band of the main signal light when operating the system as the target power, based on the first and second parameter relationships, and
controls a power of the pump light supplied in the pump light source such that the value of the target power may be obtained as the monitor result of the power of the light wavelength band of the main signal light in the second light monitor unit.

9. The distributed Raman amplifying system according to claim 1, wherein
the reference light tranmitter supplies the reference light, and the processor measures a span loss of the optical transmission path, based on the monitor results in the first and second reference light monitors, to check whether optical paths on both ends of the optical transmission path are in conductive state or not,
when the processor checks the conductive state of the optical paths, the pump light source switches the supply of the pump light from an off state to an on state and the reference light transmitter switches the supply of the reference light from the on state to the off state to monitor the noise light power of the main signal wavelength band by the distributed Raman amplification in the second light monitor and monitor the noise light power of the reference light wavelength band output from the other end of the optical transmission path by the distributed Raman amplification in the second reference light monitor, and
the processor controls a Raman gain of the main signal wavelength band through the control of the supply of the pump light in the pump light source based on the monitor results of the noise light powers of the main signal wavelength band and the reference light wavelength band, on the other hand, the reference light transmitter switches the supply of the reference light from the off state to the on state, and measures the span loss of the optical transmission path based on the monitor results in the first and second reference light monitors to check whether the optical paths of the both ends of the optical transmission path are in conductive state or not,
at the time of start-up of the distributed Raman amplifying system.

10. An optical device connected to the one end side of the optical transmission path in the distributed Raman amplifying system according to claim 1, the device comprising the first light monitor, the reference light transmitter, and the first reference light monitor.

11. An optical device connected to the other end side of the optical transmission path in the distributed Raman amplifying system according to claim 1, the device comprising the second light monitor and the second reference light monitor.

12. The optical device according to claim 10, further comprising the pump light source and the processor.

13. The optical device according to claim 11, further comprising the pump light source and the processor.

* * * * *

UNITED STATES PATENT AND TRADEMARK OFFICE
CERTIFICATE OF CORRECTION

| | |
|---|---|
| PATENT NO. | : 8,248,689 B2 |
| APPLICATION NO. | : 12/254326 |
| DATED | : August 21, 2012 |
| INVENTOR(S) | : Masanori Kondoh et al. |

It is certified that error appears in the above-identified patent and that said Letters Patent is hereby corrected as shown below:

Column 18, Line 6, in Claim 9, delete "tranmitter" and insert -- transmitter --, therefor.

Signed and Sealed this
Thirteenth Day of November, 2012

David J. Kappos
*Director of the United States Patent and Trademark Office*